(12) United States Patent
Bontus et al.

(10) Patent No.: US 11,774,025 B2
(45) Date of Patent: Oct. 3, 2023

(54) FITTING FOR CONNECTING A MAIN PIPE LINER TO A BRANCH CONDUIT

(71) Applicant: INA ACQUISTION CORP., Wilmington, DE (US)

(72) Inventors: George Bontus, St. Albert (CA); Rick Baxter, St. Louis, MO (US); Benjamin Lagosz-Sinclair, Hauppauge, NY (US); George Lohr, Hauppauge, NY (US); David Antanavige, Hauppauge, NY (US); Dennis Semet, Hauppauge, NY (US); Steven McKeefrey, Hauppauge, NY (US)

(73) Assignee: INA Acquisition Corp., Wilmington, DE (US)

( * ) Notice: Subject to any disclaimer, the term of this patent is extended or adjusted under 35 U.S.C. 154(b) by 875 days.

(21) Appl. No.: 16/669,058

(22) Filed: Oct. 30, 2019

(65) Prior Publication Data

US 2020/0132234 A1    Apr. 30, 2020

Related U.S. Application Data

(60) Provisional application No. 62/752,866, filed on Oct. 30, 2018.

(51) Int. Cl.
*F16L 41/08*    (2006.01)
*F16L 39/00*    (2006.01)
(Continued)

(52) U.S. Cl.
CPC ............... *F16L 41/08* (2013.01); *F16L 39/00* (2013.01); *F16L 15/04* (2013.01); *F16L 55/1108* (2013.01)

(58) Field of Classification Search
CPC . F16L 41/08; F16L 41/12; F16L 41/14; F16L 41/065; F16L 39/00
See application file for complete search history.

(56) References Cited

U.S. PATENT DOCUMENTS 1,896,028 A    1/1933  Burvenick
2,180,960 A    11/1939 Kennedy
(Continued)

FOREIGN PATENT DOCUMENTS

DE           4024926 A1    2/1991
DE     202005004781 U1    6/2005
(Continued)

OTHER PUBLICATIONS

Office action for related U.S. Appl. No. 16/853,272, filed Oct. 15, 2020, 9 pages.

(Continued)

*Primary Examiner* — David Bochna
(74) *Attorney, Agent, or Firm* — Stinson LLP

(57) ABSTRACT

A fitting for connecting a branch conduit to a liner installed in a main pipe is configured to mechanically connect to the branch conduit as it is inserted into the branch conduit from inside the main pipe. The mechanical connection is established without rotating the fitting. The fitting can include a body having an outer shaft section for being received in the branch conduit and an inner flange section for opposing the liner within the main pipe. The fastener include one or more teeth that extend radially from the exterior of the shaft section. The teeth can be secured to the shaft section by deforming portions of the fitting body against the teeth. The flange section supports a gasket for sealing against the liner when the fitting is installed. The flange section can include a rim that maintains the gasket in the proper position.

32 Claims, 9 Drawing Sheets

(51) Int. Cl.
*F16L 55/11* (2006.01)
*F16L 15/04* (2006.01)

(56) References Cited

U.S. PATENT DOCUMENTS

| | | | |
|---|---|---|---|
| 3,758,138 A | 9/1973 | Roseman | |
| 4,018,459 A * | 4/1977 | Mominee | F16L 41/06 |
| | | | 285/200 |
| 4,245,970 A | 1/1981 | St. Onge | |
| 4,637,638 A | 1/1987 | Rush et al. | |
| 4,887,851 A * | 12/1989 | Rush | F16L 31/02 |
| | | | 285/200 |
| 4,951,758 A | 8/1990 | Sonku et al. | |
| 4,986,951 A | 1/1991 | Ledoux et al. | |
| 5,050,912 A | 9/1991 | Hayasaka | |
| 5,085,472 A | 2/1992 | Guest | |
| 5,150,056 A | 9/1992 | Wilcock | |
| 5,318,395 A | 6/1994 | Driver | |
| 5,334,429 A | 8/1994 | Imoto et al. | |
| 5,368,423 A | 11/1994 | Hanna | |
| 5,384,086 A | 1/1995 | Smith | |
| 5,439,256 A * | 8/1995 | Brainard | F16L 41/08 |
| | | | 285/200 |
| 5,520,569 A | 5/1996 | Endoh | |
| 5,577,776 A * | 11/1996 | Welch | F16L 41/06 |
| | | | 285/55 |
| 5,778,937 A | 7/1998 | Sündermann | |
| 5,779,284 A | 7/1998 | Guest | |
| 5,971,032 A | 10/1999 | Ward | |
| 6,056,017 A | 5/2000 | Kamiyama et al. | |
| 6,068,725 A * | 5/2000 | Tweedie | F16L 55/179 |
| | | | 264/269 |
| 6,082,411 A | 7/2000 | Ward | |
| 6,173,999 B1 | 1/2001 | Guest | |
| 6,183,022 B1 | 2/2001 | Guest | |
| 6,299,803 B1 | 10/2001 | Ledoux | |
| 6,641,688 B1 | 11/2003 | Gearhart | |
| 6,651,699 B2 | 11/2003 | Kweon | |
| 7,094,308 B1 | 8/2006 | Gearhart | |
| 7,341,286 B2 * | 3/2008 | Andre | F16L 37/091 |
| | | | 285/104 |
| 7,631,665 B2 | 12/2009 | Mühlin | |
| 7,707,704 B2 | 5/2010 | Crocker et al. | |
| 7,878,220 B2 | 2/2011 | Fierst et al. | |
| 7,878,554 B2 | 2/2011 | Le Bars | |
| 8,015,695 B2 | 9/2011 | Polivka et al. | |
| 8,049,634 B2 | 11/2011 | Smith et al. | |
| 8,197,158 B2 | 1/2012 | Sudano et al. | |
| 8,272,406 B2 | 9/2012 | McKaigue et al. | |
| 8,272,808 B1 | 9/2012 | Sudano et al. | |
| 8,561,646 B2 | 10/2013 | Cain | |
| 8,844,980 B2 * | 9/2014 | Le Quere | F16L 37/091 |
| | | | 285/316 |
| 8,864,418 B2 | 10/2014 | Gagnon et al. | |
| 9,016,322 B2 | 4/2015 | Vogt et al. | |
| 9,347,212 B2 | 5/2016 | Bichler | |
| 9,410,654 B2 | 8/2016 | Gagnon et al. | |
| 9,446,455 B2 | 9/2016 | Gagnon et al. | |
| 9,494,270 B2 | 11/2016 | Cain et al. | |
| 9,581,280 B2 | 2/2017 | Bichler | |
| 9,719,621 B2 | 8/2017 | Yoneda et al. | |
| 11,079,055 B2 * | 8/2021 | Bontus | F16L 41/12 |
| 2002/0130515 A1 | 9/2002 | Mlyajima et al. | |
| 2003/0116211 A1 | 6/2003 | Ward | |
| 2003/0173777 A1 * | 9/2003 | Jeong | F16L 41/14 |
| | | | 285/197 |
| 2004/0089358 A1 | 5/2004 | Burd et al. | |
| 2005/0200037 A1 | 9/2005 | Sanders | |
| 2009/0289451 A1 | 11/2009 | Oxner et al. | |
| 2010/0078895 A1 | 4/2010 | Sudano et al. | |
| 2011/0083766 A1 * | 4/2011 | Anders | F16L 55/179 |
| | | | 138/98 |
| 2011/0318099 A1 * | 12/2011 | Le Quere | F16L 37/008 |
| | | | 403/376 |
| 2012/0175872 A1 * | 7/2012 | Lindsey | B29C 66/322 |
| | | | 137/15.09 |
| 2015/0273776 A1 | 10/2015 | Heuser | |
| 2016/0178108 A1 | 6/2016 | Ehsani | |
| 2017/0108156 A1 | 4/2017 | Penza et al. | |
| 2018/0230339 A1 | 8/2018 | Ramsay et al. | |
| 2018/0328531 A1 | 11/2018 | Weisenberg et al. | |
| 2019/0056054 A1 | 2/2019 | Morissette et al. | |
| 2019/0278028 A1 | 9/2019 | Higley | |

FOREIGN PATENT DOCUMENTS

| | | |
|---|---|---|
| EP | 0290184 B1 | 10/1991 |
| EP | 1488160 B1 | 8/2006 |
| GB | 1205170 | 9/1970 |
| GB | 2041147 A | 9/1980 |
| GB | 2508215 A | 5/2014 |
| WO | 199003260 A1 | 4/1990 |
| WO | 199047847 A1 | 9/1999 |
| WO | 199945307 A1 | 9/1999 |
| WO | 200055539 A1 | 9/2000 |
| WO | 2010115290 A1 | 10/2010 |
| WO | 2013095155 A1 | 6/2013 |

OTHER PUBLICATIONS

Office action for related U.S. Appl. No. 16/853,272, filed Feb. 3, 2021, 10 pages.
Office action for related U.S. Appl. No. 16/853,272, filed May 28, 2020, 8 pages.
International Search Report and Written Opinion for PCT Application No. PCT/US19/58856, dated Jan. 21, 2020, 19 pages, United States.

* cited by examiner

FITTING FOR CONNECTING A MAIN PIPE LINER TO A BRANCH CONDUIT

CROSS-REFERENCE TO RELATED APPLICATIONS

This application claims priority to U.S. Provisional Patent Application No. 62/752,866, filed Oct. 30, 2018, which is hereby incorporated by reference in its entirety.

FIELD

This disclosure pertains to a fitting for connecting a branch conduit, such as a service line, and a liner installed in a main pipe, such as a water main.

BACKGROUND

Referring to FIG. 1A, in various pipe systems that carry fluid under pressure (e.g., municipal water systems, service water systems, etc.), it is common for a main pipe M to be fluidly coupled to one or more branch conduits C (e.g., user connections) at respective junctions J. For example, in a water distribution system, a water main M can be coupled to a plurality of corporation stops C that provide connections to water service lines. Over the life of a pipe system, it may become necessary to rehabilitate or repair the main pipe M.

One technique for rehabilitating the main pipe M comprises installing a cured-in-place pipe (CIPP) liner L (FIGS. 1C and 1D). A conventional sequence of steps for lining a main pipe M with a CIPP liner L is illustrated schematically in FIGS. 1B-1D. Before positioning the liner L in the main pipe M, the openings to the corporation stops C are sealed with plugs P (FIG. 1B). Subsequently, a CIPP liner is installed in the main pipe M (FIG. 1C). The plugs P prevent resin in the liner L from entering the corporation stops C as the liner is pressed outwardly against the wall of the main pipe M and cured. After installation of the liner L is complete, holes are formed in the liner and portions of the plugs P are removed to restore fluid communication between the rehabilitated main pipe M and the corporation stops C. If the pipe system is designed to carry fluids under pressure, it may be desirable to connect the liner L to the corporation stop C so that the pressurized fluid does not cause the liner to delaminate from the main pipe M and/or to prevent exfiltration of the pressurized fluid through the interfaces of the junction J.

Various ways of connecting a liner L to a corporation stop C are known. In examples described in U.S. Pat. No. 8,015,695 and U.S. Patent Application Publication No. 2009/0289451, attached hereto and forming a part of the disclosure of this application, a threaded fitting is configured to self-tap into the corporation stop C. The fitting can be installed by a robot that carries the fitting through the liner L to position the fitting in the interior of the liner at the junction J and then rotates the fitting to threadably connect the fitting to the corporation stop C. When the fitting is threaded into the corporation stop C, a flange of the fitting compresses a gasket against the liner L to form a fluid seal about the junction J.

SUMMARY

In one aspect, a fitting for connecting a branch conduit to a liner installed in a main pipe comprises a fitting body having an inner end portion and an outer end portion spaced apart along an axis and defining a passage extending through the fitting body from the inner end portion through the outer end portion. The fitting body is configured to be inserted into the branch conduit to position the fitting at an installed position in which the fitting connects the liner to the branch conduit and the passage provides fluid communication between the interior of the liner and the branch conduit. A fastener is connected to the fitting body. The fastener is configured to establish a mechanical connection between the fitting and the branch conduit as the fitting body is inserted into the branch conduit without rotating the fastener a complete revolution about the axis. The mechanical connection secures the fitting body at the installed position.

In another aspect, a method of connecting a branch conduit to a liner installed in a main pipe comprises positioning a fitting comprising a fitting body and a fastener connected to the fitting body in an interior of the liner. The fitting body is inserted into the branch conduit without rotating the fastener a complete revolution about an axis of the fitting body. After performing said step of inserting the fitting body, the fastener mechanically connects the fitting to the branch conduit at an installed position in which the fitting connects the liner to the branch conduit.

In another aspect, a method of making a fitting for connecting a branch conduit to a liner installed in a main pipe comprises forming a fitting body comprising a tube having an inner end portion and an outer end portion and an exterior surface extending along an axis between the inner end portion and the outer end portion. A mounting region of the tube is deformed against a fastener to mount the fitting body on the exterior surface of the tube such that a tooth of the fastener extends radially outward from the exterior surface.

In another aspect, a fitting for connecting a branch conduit to a liner installed in a main pipe comprises a fitting body having an axis. The fitting body comprises a shaft section defining an outer end portion of the fitting body and a flange section defining an inner end portion of the fitting body. The inner and outer end portions are spaced apart along the axis and the flange section extends radially outward from the shaft section with respect to the axis. The fitting defines a passage extending through the fitting body from the inner end portion through the outer end portion. The shaft section is configured to be inserted into the branch conduit to position the fitting at an installed position in which the shaft section is received in the branch conduit and the flange section is received in the main pipe and opposes the liner. The flange section has a perimeter and a rim portion at the perimeter. The rim portion comprises a wall extending along the axis toward the outer end portion of the fitting body. An annular compressible gasket extends around the shaft section and is seated against the flange section radially inboard of the rim portion such that the rim portion overlaps a radially outward facing surface of the annular compressible gasket with respect to the axis of the fitting body.

Other aspects and features will also be apparent.

BRIEF DESCRIPTION OF THE DRAWINGS

Corresponding reference characters indicate corresponding parts throughout the drawings.

DETAILED DESCRIPTION

Figure 3:
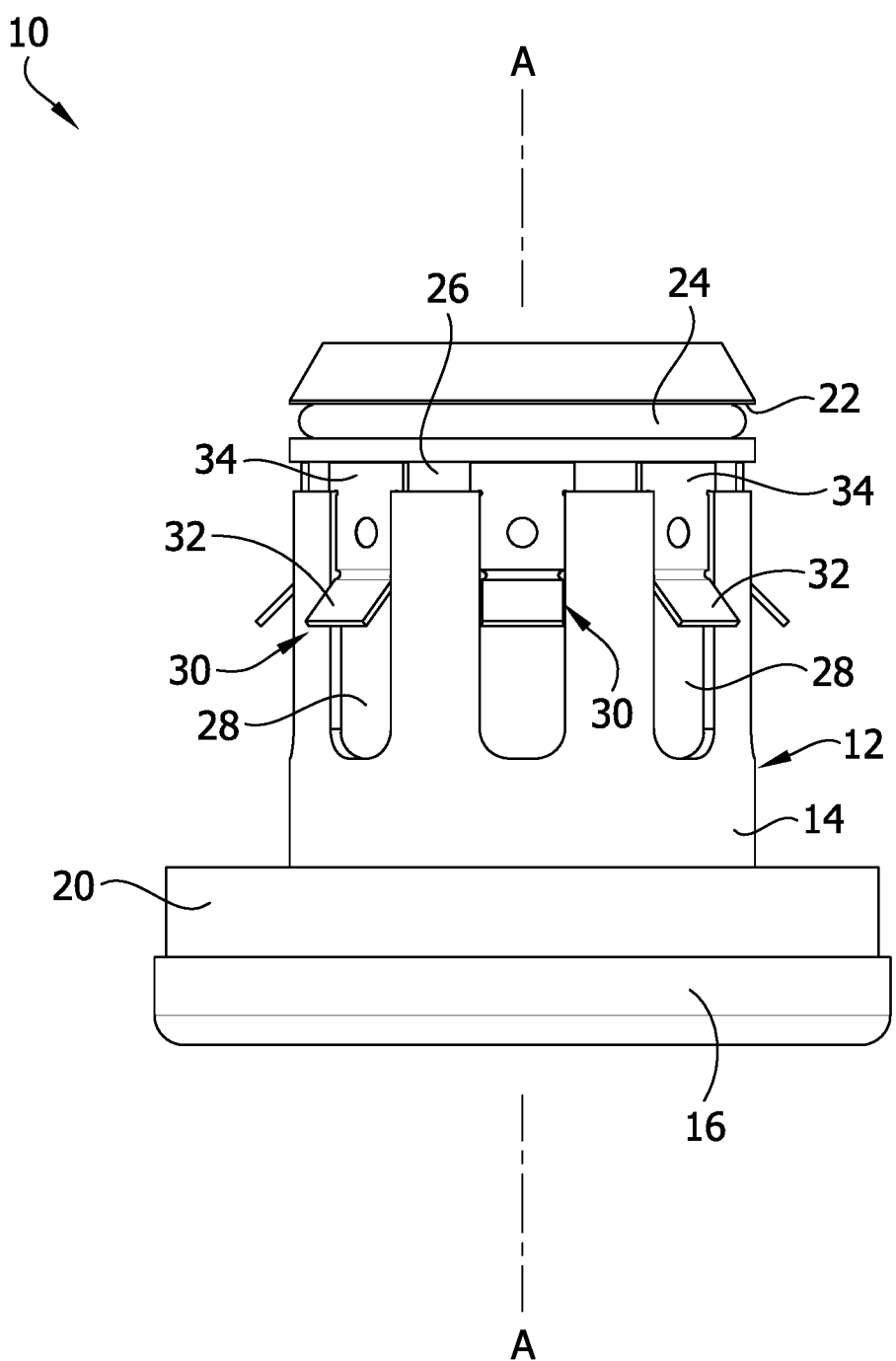
FIG. 3 is an elevation of the fitting.
Figure 4:
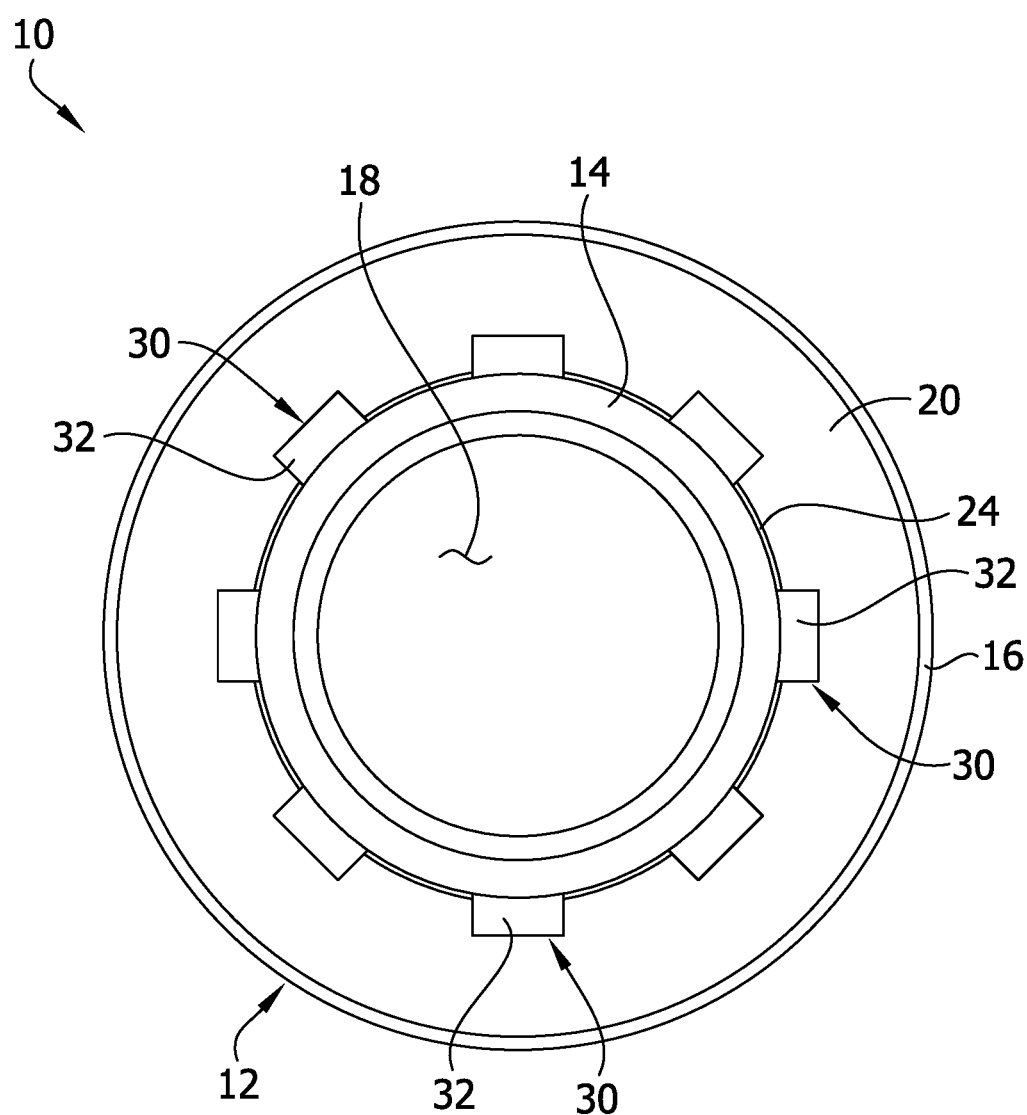
FIG. 4 is a top plan view of the fitting.
Figure 5:
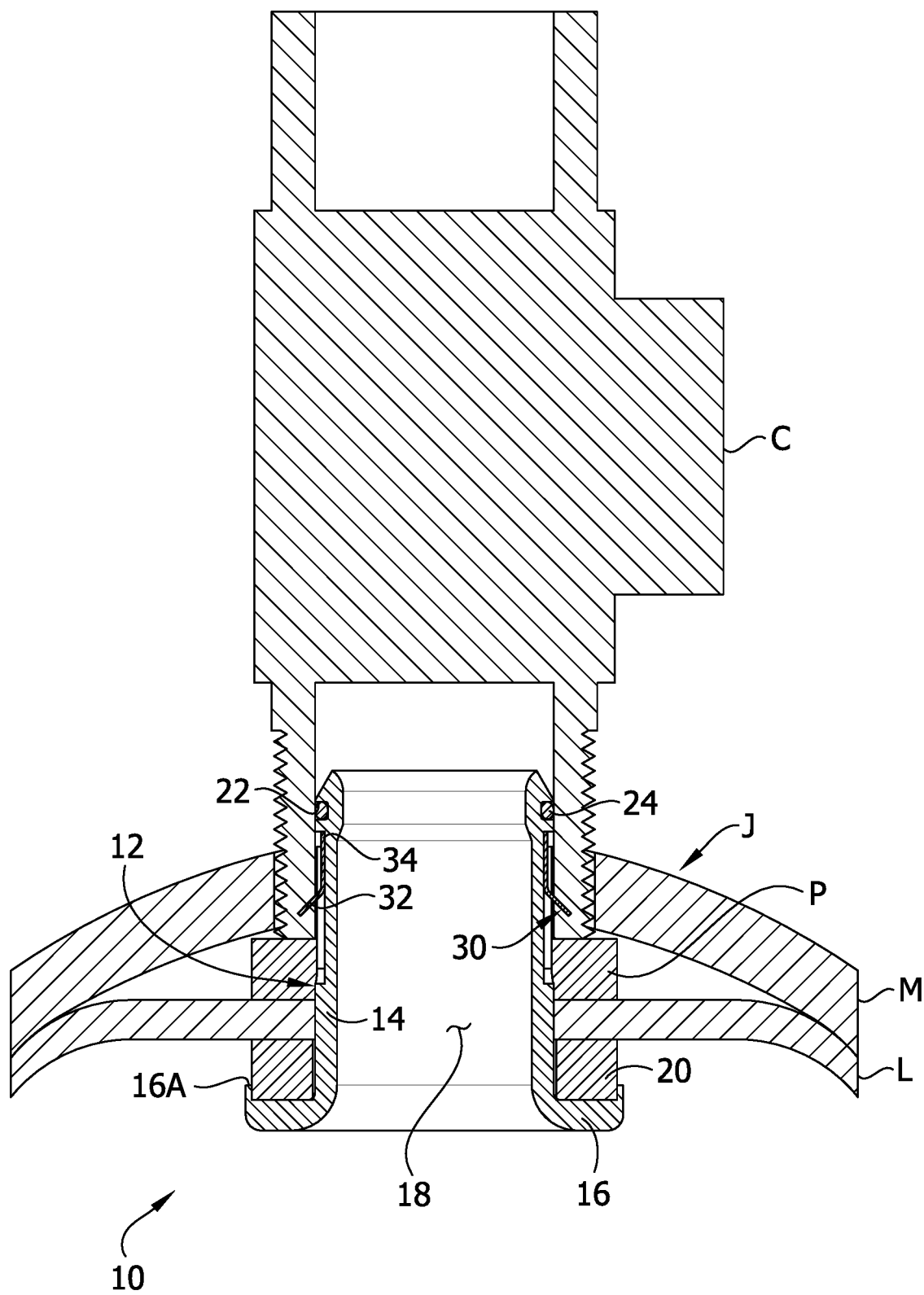
FIG. 5 is a longitudinal section of the fitting at an installed position at a junction between the main pipe and the corporation stop.

Referring to FIGS. 2-5, one embodiment of a fitting for connecting a branch conduit C to a liner L installed in a main pipe M is generally indicated at reference number 10. In the exemplary embodiment shown in FIG. 5, the branch conduit C comprises a corporation stop made of, for example, brass. In certain embodiments, the fitting 10 can be used to establish a connection between the liner L and a corporation stop C that is directly tapped into the wall of the main pipe as shown in FIG. 5. As will be explained in further detail below, a differently sized fitting of similar construction can also be used to connect a liner to corporation stop that is connected to the main pipe by a pipe saddle. Fittings can also be used to connect liners L to other types of branch conduits C without departing from the scope of the invention.

The fitting 10 comprises a fitting body, generally indicated at 12. In one or more embodiments, the fitting body 12 is formed from stainless steel or another material of sufficient strength that is resistant to corrosion. The illustrated fitting body 12 comprises a tube that extends along an axis A and includes a generally cylindrical shaft section 14 and an annular flange section 16. The flange section 16 defines an inner end portion of the fitting body 12 and the shaft section 14 defines an outer end portion of the fitting body. The inner end portion and the outer end portion of the fitting body 12 are spaced apart from one another along an axis A. The outer end portion of the fitting body 12 is configured to be inserted into the branch conduit C when the fitting is installed and thus the outer end portion of the fitting body is located laterally outward of the inner end portion when the fitting 10 is in use. The fitting body 12 has a passage 18 that extends through the fitting body from the inner end portion through the outer end portion.

As will be explained in further detail below, the fitting body 12 is configured to be inserted into the corporation stop C from inside the main pipe M (e.g., using a robot (not shown)) to an installed position. At the installed position shown in FIG. 5, the shaft section 14 of the fitting body 12 is received in the corporation stop C and the flange section 16 is received in the interior of the liner L. The passage 18 provides fluid communication between the interior of the liner L and the corporation stop C when the fitting 10 is installed. Suitably, the outer diameter of the shaft section 14 is about the same as the inner diameter of the corporation stop C such that the shaft section 14 has a relatively close tolerance fit with the corporation stop in the installed position (e.g., the outer diameter of the shaft section is less than 2 mm less than the inner diameter of the corporation stop, such as less than 1 mm, less than 0.75 mm, or about 0.5 mm).

An annular resiliently compressible gasket 20 (broadly, a seal) extends circumferentially around the shaft section 14 and is seated on the flange section 16 (broadly, is connected to the fitting body 12). When the fitting 10 is in the installed position, the flange section 16 compresses the gasket 20 against the liner L to form a fluid seal about the junction J between the fitting body 12 and the liner. In the illustrated embodiment, the flange section 16 comprises a raised collar or rim portion 16A, which extends circumferentially around the gasket 20. The rim portion 16A comprises an annular wall that extends axially from the perimeter of the flange section 16 toward the outer end of the fitting body. The rim portion 16A overlaps a radially outward facing surface of the annular compressible gasket 20 with respect to the axis of the fitting body 12. Suitably, the rim portion 16A has a height along the axis of the fitting body 12 that is less than the height of the gasket 20 along the axis of the fitting body. As such, the gasket 20 can contact the liner L and be compressed; the edge of the rim portion 16A does not interfere with compression of the gasket. When the gasket is compressed, the rim portion 16A prevents the gasket 20 from expanding or shifting irregularly so that a seal is maintained with the full circumference of the fitting body 12 after the gasket is compressed. The rim portion 16A thus radially contains the gasket 20 so that it remains seated on the flange section 16 at an operative position for forming a seal between fitting body 12 and the liner L. For example, the rim portion 16A is configured to contain the gasket 20 so that an entirety of the gasket is radially inboard of the perimeter of the flange section 16 when the gasket is compressed, e.g., no portion of the gasket moves radially outward beyond the outer perimeter of the flange section. As will be explained in further detail below, the resilient gasket 20 imparts a spring force on the flange section 14 that urges the fitting body 12 in an inward direction along the axis A, toward the interior of the liner L.

Figure 1A:
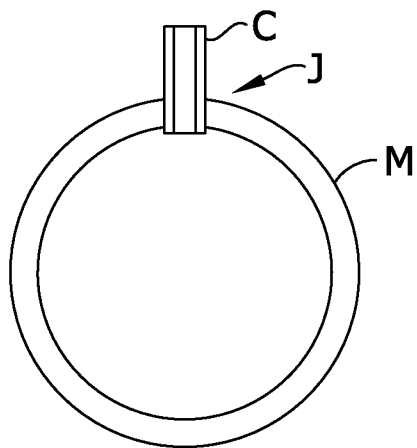
FIGS. 1A-1D are a series of schematic illustrations that show a conventional method of lining a main pipe that is connected to a corporation stop.
Figure 1B:
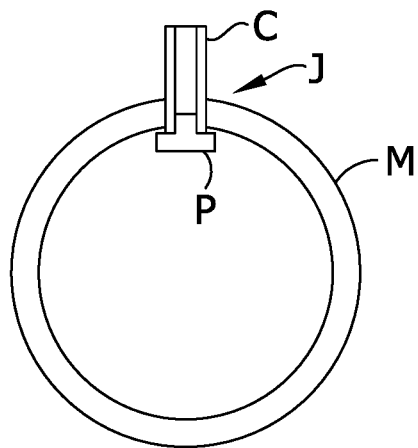
Figure 1C:
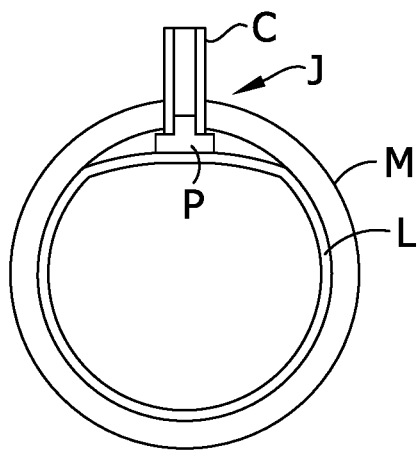
Figure 1D:
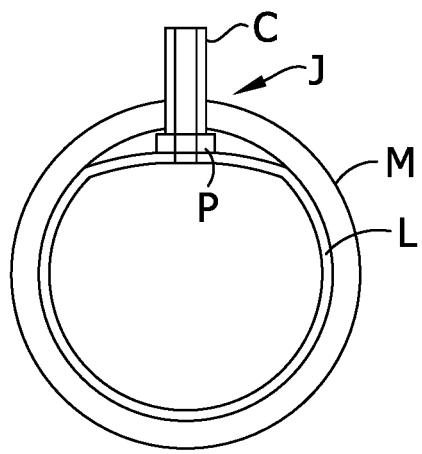
Figure 2:
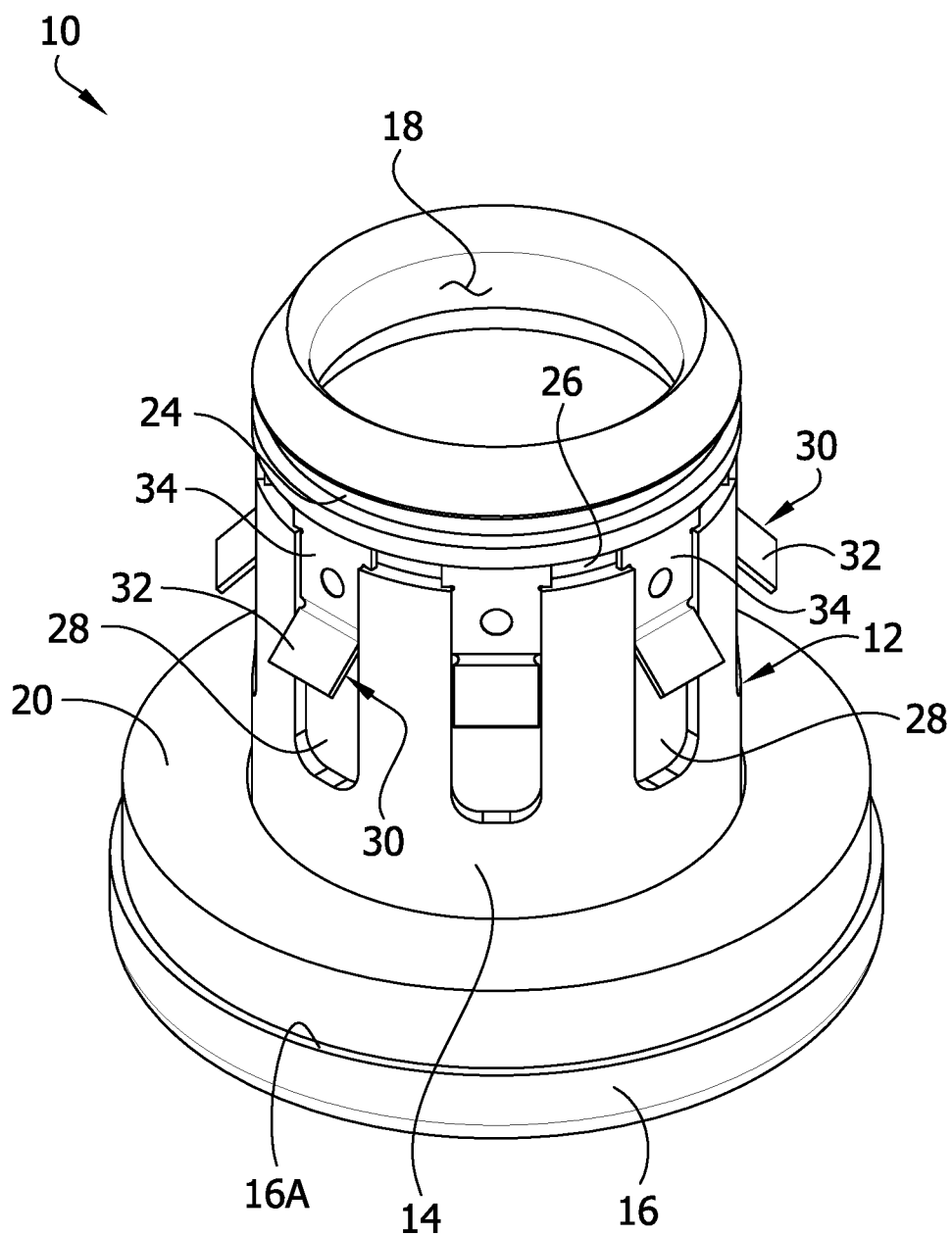
FIG. 2 is a perspective of a fitting for connecting a liner installed in a main pipe to a corporation stop.
Figure 6:
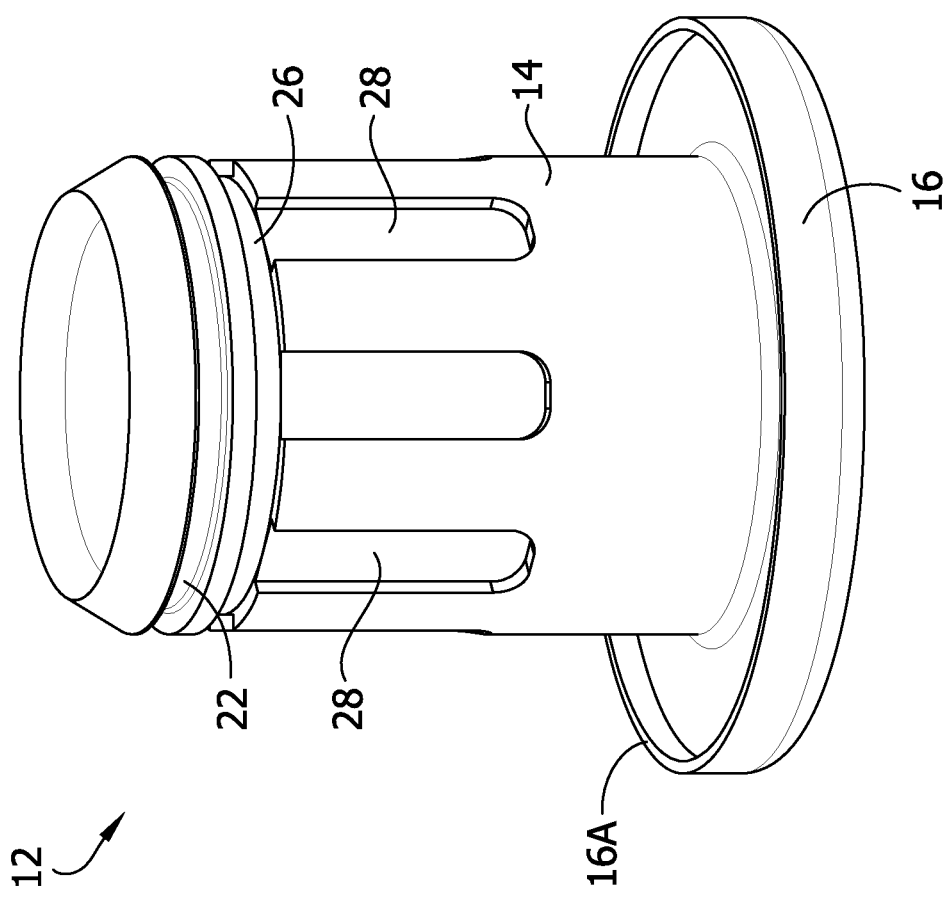
FIG. 6 is a perspective of a fitting body of the fitting.

The shaft section 14 of the fitting body 12 is configured for being installed in the corporation stop C. In the illustrated embodiment, the shaft section 14 comprises a tapered tip that aids in centering the outer end portion of the fitting body 12 in the opening of the junction J when inserting the fitting 10. As shown in FIG. 6, the shaft section 14 includes an annular groove 22 adjacent the tapered tip. As shown in FIGS. 2, 3, and 5, the groove 22 is configured to receive a gasket 24 (e.g., an O-ring). Suitably, the gasket 24 is sized to radially protrude slightly from the exterior surface of the shaft section 14 before the gasket is compressed. Thus when the fitting 10 is installed and the shaft section 14 is received in the corporation stop C in a close tolerance fit, the gasket 24 is compressed and forms a fluid seal between the shaft section 14 and the corporation stop C. The groove 22 is positioned along the length of the shaft section 14 adjacent the outer end portion of the fitting body such that, when the fitting 10 is installed, the gasket 24 engages the corporation stop C at a location spaced apart outwardly along the length of corporation stop from the junction J. Thus, the gaskets 20, 24 are configured to establish a sealed fluid connection between the liner L and the corporation stop C that isolates the junction J (and the interfaces between the corporation stop, the main pipe M, the liner L, and the remnant of the plug P) from fluid flowing through the pipe system.

Referring to FIG. 6, the exterior surface of the shaft section 14 defines an annular fastener-mounting groove 26 and a plurality of longitudinal fastener-mounting grooves 28. The longitudinal fastener-mounting grooves are located at spaced apart positions about the circumference of the fitting body 12 and extend from the annular fastener-mounting groove 26 parallel to the axis A toward the flanged section 16 of the fitting body 12. The fastener-mounting grooves 26, 28 are configured to receive fasteners, generally indicated at 30, therein. As will be explained in further detail below, when the fasteners 30 are mounted on the fitting body 12 in the grooves 26, 28, they form teeth configured establish a mechanical connection between the fitting body 12 and the corporation stop C that secures the fitting 10 at the installed position. As will be explained in further detail below, unlike the helical thread of the fittings disclosed in U.S. Pat. No. 8,015,695 and U.S. Patent Application Publication No. 2009/0289451, the teeth 30 are configured to establish a secure mechanical connection between the fitting and the corporation stop, merely by inserting the fitting 10 axially into the conduit. So for example, the teeth 30 are configured to establish the mechanical connection as the fitting body is inserted to the corporation stop C to the installed position without rotating a tooth a complete revolution about the axis A (e.g., without rotating a tooth one-half of a revolution about the axis A, without rotating a tooth one-quarter of a revolution about the axis, etc.). In a preferred embodiment, the fitting 10 is inserted without any rotation.

Referring to FIGS. 2-4, in the illustrated embodiment, the fitting 10 comprises eight fasteners 30 that are mounted on fitting body 12 to form eight teeth at equally spaced positions about the axis A. Other embodiments could include other numbers (e.g., one or more) or arrangements of fasteners or teeth without departing from the scope of the invention. In one or more embodiments, each of the fasteners 30 is formed from a corrosion resistant metal, such as stainless steel, which has a hardness that is greater than the hardness of the material defining the interior surface of the corporation stop C. As will be explained in further detail below, using fasteners 30 that are harder than the corporation stop C allows the fasteners to deform (e.g., gouge) the corporation stop C if the fitting 10 is urged in a direction outward from the corporation stop from the installed position. This enhances the strength of the mechanical connection between the fitting 10 and the corporation stop C. It will be appreciated that the fasteners can be formed from other metals and non-metals without departing from the scope of the invention.

Figure 7:
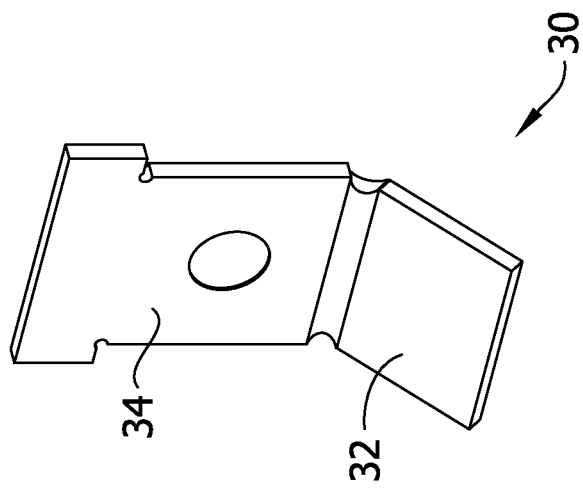
FIG. 7 is a perspective of a fastener of the fitting.
Figure 8:
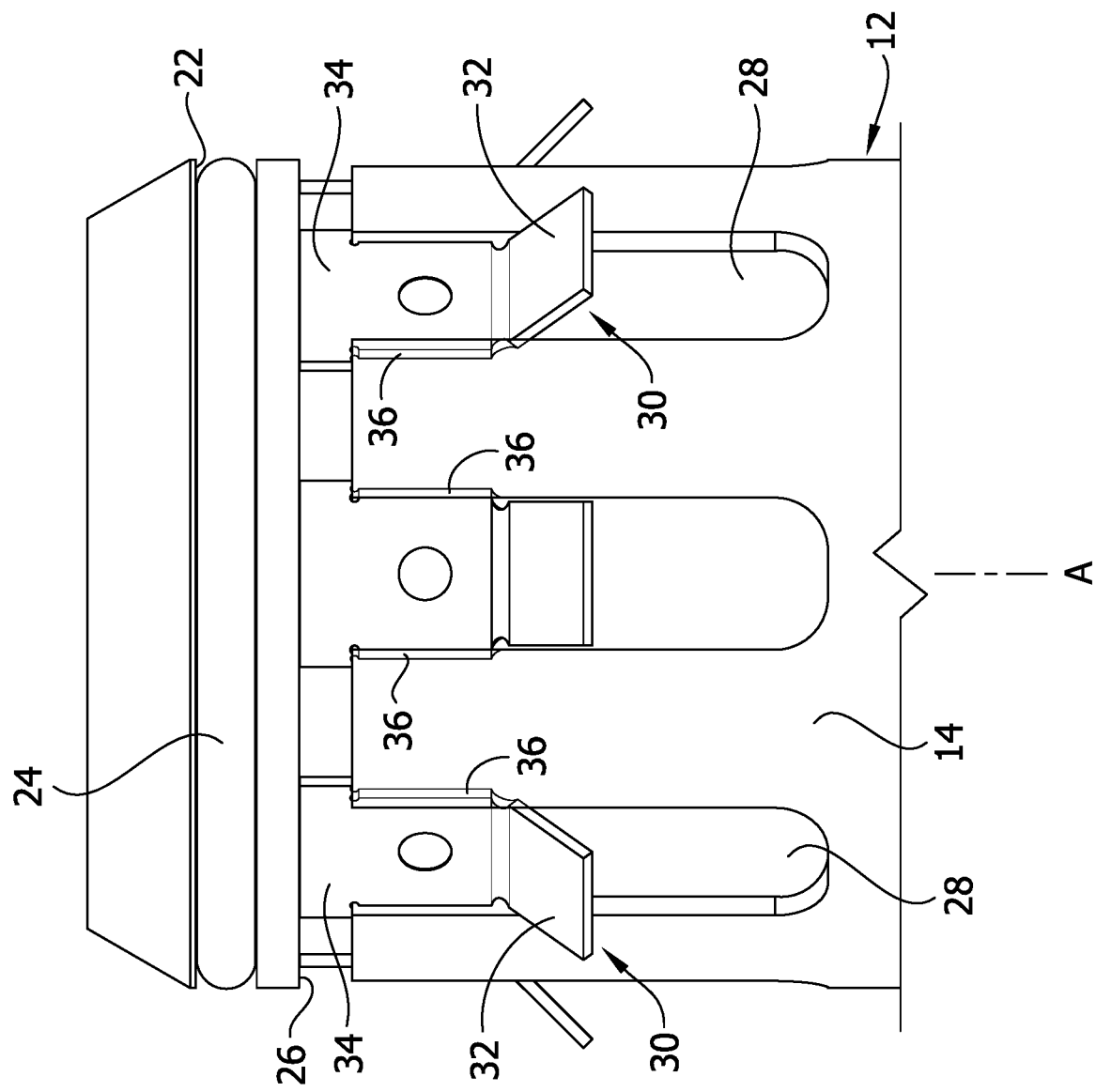
FIG. 8 is an enlarged fragmentary elevation of an outer end portion of the fitting.

As shown in FIG. 7, each of the fasteners 30 includes a tooth 32 and a mounting portion 34 oriented transverse to (e.g., at an oblique angle with respect to) the tooth. When the fasteners 30 are mounted on the fitting body as shown in FIGS. 2, 3 and 8, the mounting portions 34 are received in the fastener-mounting grooves 26, 28 and extend generally parallel to the axis A. The fasteners 30 are mounted on the fitting body 12 at a location adjacent the outer end of the fitting body but are spaced inward along the axis A from the gasket 24. In one or more embodiments, the fasteners 30 are mounted on the fitting body 12 at a location closer to the outer end portion of the fitting body than the inner end of the fitting body. More specifically, a bottom segment of each mounting portion 34 is received in a respective longitudinal fastener-mounting groove 28 and a top segment of the mounting portion, which is wider than the bottom segment, is received in the annular fastener-mounting groove 26. The top segment of each mounting portion 34 opposes the top and bottom edges of the annular fastener-mounting groove 26 to prevent the fastener 30 from moving relative to the fitting body 12 along the axis A. The bottom segment of each mounting portion 34 opposes the longitudinal side edges of the respective longitudinal fastener-mounting groove 28 to prevent the fastener 30 from moving relative to the fitting body 12 about the axis A.

In one or more embodiments, each fastener 30 is secured to the fitting body 12 without a discrete mechanical fastener, an adhesive bond, or a thermal bond such as a welded bond, a soldered bond, a brazed bond, or the like. Referring to FIG. 8, the illustrated fitting body 12 comprises swaged regions 36 along the longitudinal side edges of each longitudinal fastener-mounting groove 28 that secure the mounting portion 34 of the respective fastener to the fitting body. The swaged regions 36 are pressed against the outer surface of each mounting portion 34 to clamp each fastener 30 firmly in position. Using swaging to secure the fasteners 30 to the fitting body 12, in contrast to discrete mechanical fasteners, adhesives, or thermal bonds, introduces no openings or foreign materials into the fitting 10 and moreover allows the wall thickness of the shaft section of the fitting body to be minimized, thereby minimizing the extent to which the installed fitting obstructs fluid flow through the junction J. In one or more embodiments, the shaft section has a wall thickness in an inclusive range of from about 1 mm to about 3 mm.

The tooth 32 of each fastener 30 extends radially outward from the outer end portion of the fitting body 12 with respect to the axis. In the illustrated embodiment, each tooth 32 slopes inward toward the flanged section 16 of the fitting body 12 as it extends radially outward. In one or more embodiments, each tooth 32 extends at an angle of about 45° with respect to the axis A. It can be seen in FIG. 5 that the teeth 32, which protrude radially outward from the shaft section 14, extend radially outward past the inner diameter of the corporation stop C. Thus, as the shaft section 14 of the fitting body 12 is inserted into the corporation stop, the teeth 32 of the fasteners 30 will engage the interior surface of the corporation stop. The teeth 32 are configured to resiliently bend radially inward toward the axis A as the shaft section 14 is inserted into the corporation stop C. The longitudinal fastener-mounting grooves 28 provide clearance for the teeth 30 to bend inwardly. The inwardly bent fasteners 30 tend to resiliently rebound radially outwardly. Thus, after the teeth 30 are bent inwardly during installation, they impart a radially outward force (e.g., press outwardly) against the corporation stop C and thereby mechanically connect the fitting 10 to the corporation stop.

The radially protruding teeth 32 are also configured to deform the corporation stop C when forces are imparted on the fitting 10 after it is installed which tend to forcibly remove the fitting from the corporation stop (e.g., forces in an inward direction along the axis A). Each tooth 32 has a radially outward edge and first and second side edges that are angularly spaced apart about the circumference of the fitting body 12. In one or more embodiments, the radially outer edge of the tooth 32 is ground to define a sharp angle (e.g., a sharp right angle) with one or both of the inner and outer major surfaces of the tooth. After the fitting 10 is installed, forces imparted on the fitting 10 tending to urge shaft section 14 out of the corporation stop C into the interior of the liner L (e.g., the spring force of the gasket 20) will cause the ground outer edge of each fastener 30 to bear against and dig into the interior surface of the corporation stop. As a result, the ground edges of the fasteners 30 strongly engage and may slightly gouge the corporation stop C and thus protrude slightly into the wall thickness of the corporation stop. This enhances the strength of the mechanical connection between the fitting 10 and the corporation stop C and prevents the fitting body 12 from being pulled out of the corporation stop.

Referring again to FIGS. 1A-1D, in one or more embodiments of a method of rehabilitating a main pipe M, after the liner L is installed and an opening is formed to provide fluid communication between the interior of the liner and the corporation stop C, a mechanical fitting 10 can be installed to connect the liner to the corporation stop. In certain embodiments, an installation robot (not shown) carries one or more mechanical fittings 10 through the interior of the installed liner L to the junction(s) J. The robot, which can be manually controlled or automated, aligns the robot with a junction J such that the shaft section 14 of the fitting body 12 is generally aligned with the passage of the corporation stop C. Referring to FIG. 5, then the robot uses a linear movement mechanism (e.g., a piston, a spring, etc.) to insert the shaft section 14 of the fitting body 12 into the corporation stop C. In one or more embodiments, the linear movement mechanism pushes the shaft section 14 of the fitting body 12 into the corporation stop C without rotation of the fitting body. It will be understood that some rotation may be permitted, such as less than one complete rotation of the fitting 10.

As the fitting body is inserted, the fasteners 30 engage the interior surface of the corporation stop C to establish a mechanical connection between the fitting 10 and the corporation stop. The teeth 32 of the fasteners 30 resiliently bend inwardly as the fitting 10 is advanced along the corporation stop. The flange section 16 compresses the gasket 20 against the liner L to form a fluid seal between the fitting body 12 and the liner about the junction J when the fitting body reaches the installed position. After the fitting 10 is in the installed position, the robot releases the fitting. The teeth 32 resiliently rebound, pressing outward against the wall of the corporation stop C and thereby establishing a mechanical connection. The resiliently compressible gasket 20 also imparts a spring force between the flange section 16 and the liner L that urges the fitting body 12 in an inward direction along the axis A. The spring force causes the ground outer edges of the fasteners 30 to bear against the corporation stop C and strengthen the mechanical connection. With the fitting body 12 secured in place by the mechanical connection, the flange section 16 holds the portion of the liner L adjacent the junction J against the main pipe to prevent delamination of the liner.

In the installed position, the gasket 20 provides an inner fluid seal between the liner L and the fitting body 12 and the gasket 24 provides an outer fluid seal between the corporation stop C and the fitting body. The inner and outer fluid seals provide a sealed connection between the liner L and the corporation stop and fluidly isolate the interfaces at the junction J between the main pipe M, the liner, the corporation stop C, and/or the plug remnant P from the fluid flowing through the liner and the corporation stop. The mechanical connection provided by the teeth 30 holds the fitting 10 in the installed position against the spring force of the gasket 10 such that the inner and outer fluid seals are maintained. If additional forces are imparted on the fitting 10 that urge the fitting inwardly along the axis A into the lined main pipe M, the outer edges of the fasteners 30 further bear against the corporation stop with still greater force to maintain the mechanical connection. If forces are imparted on the fitting 10 that urge the fitting in the opposite direction, the flange section 16 compresses the gasket 20 to enhance the strength of the inner fluid seal while maintaining the outer fluid seal.

In an exemplary method of making the fitting 10, the fitting body is formed by machining a single piece of, for example, stainless steel. Each of the fasteners 30 is likewise formed from a single piece of, for example, stainless steel. The mounting portions 34 of the fasteners are placed into the fastener-mounting grooves 26, 28 and then the longitudinal edges of each longitudinal fastener-mounting groove (broadly, a mounting region of the fitting body) is deformed (e.g., swaged) against the respective fastener. The deformed regions 36 thereby clamp the mounting portions 34 in place on the fitting body 12 to mount the fasteners 30 on the fitting body. The fitting 10 formed according to this method comprises a fitting body 12 plastically deformed into engagement with fasteners 30 to mount the fasteners on the fitting body.

Figure 9:
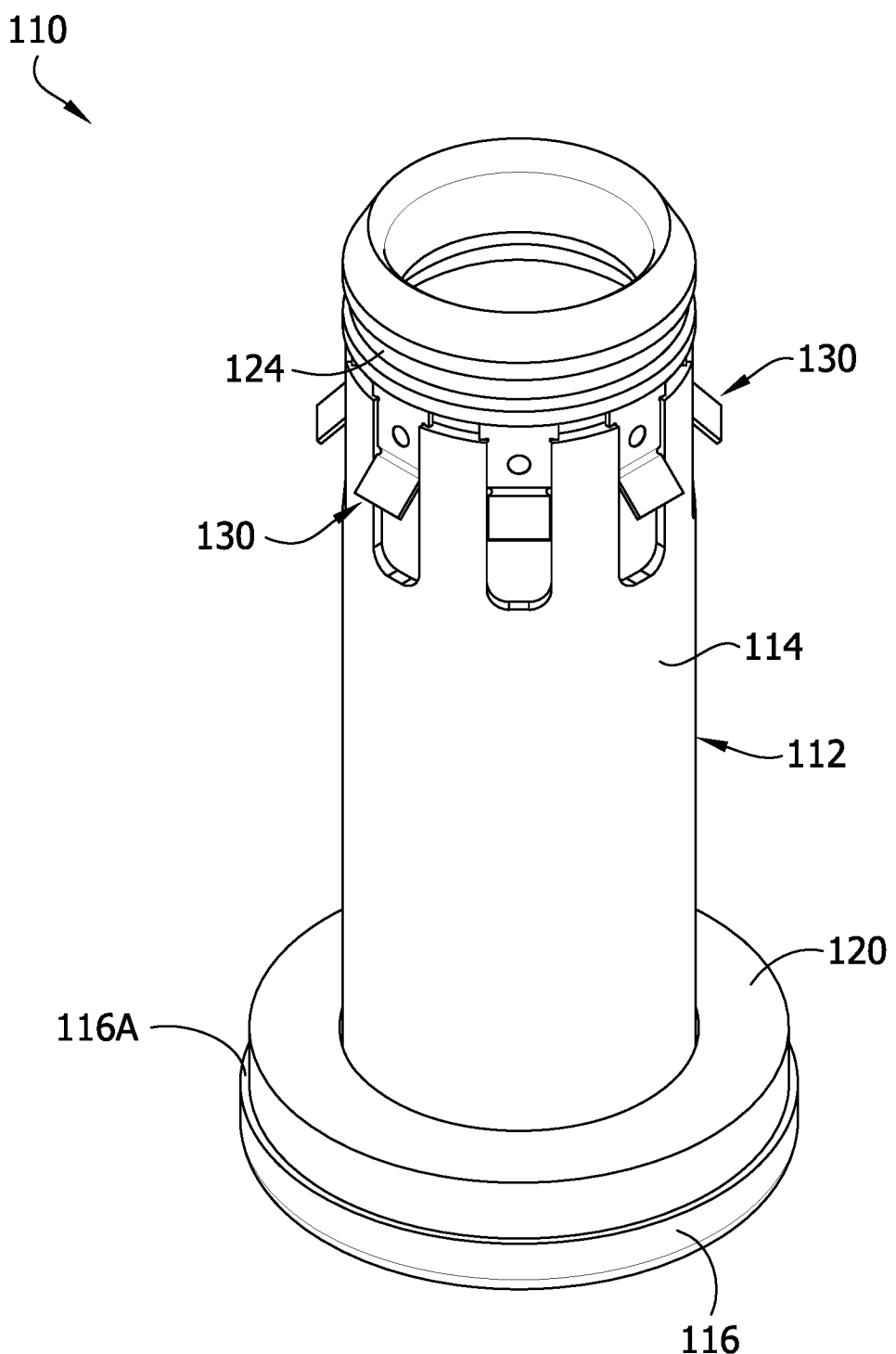
FIG. 9 is a perspective of another embodiment of a fitting.
Figure 10:
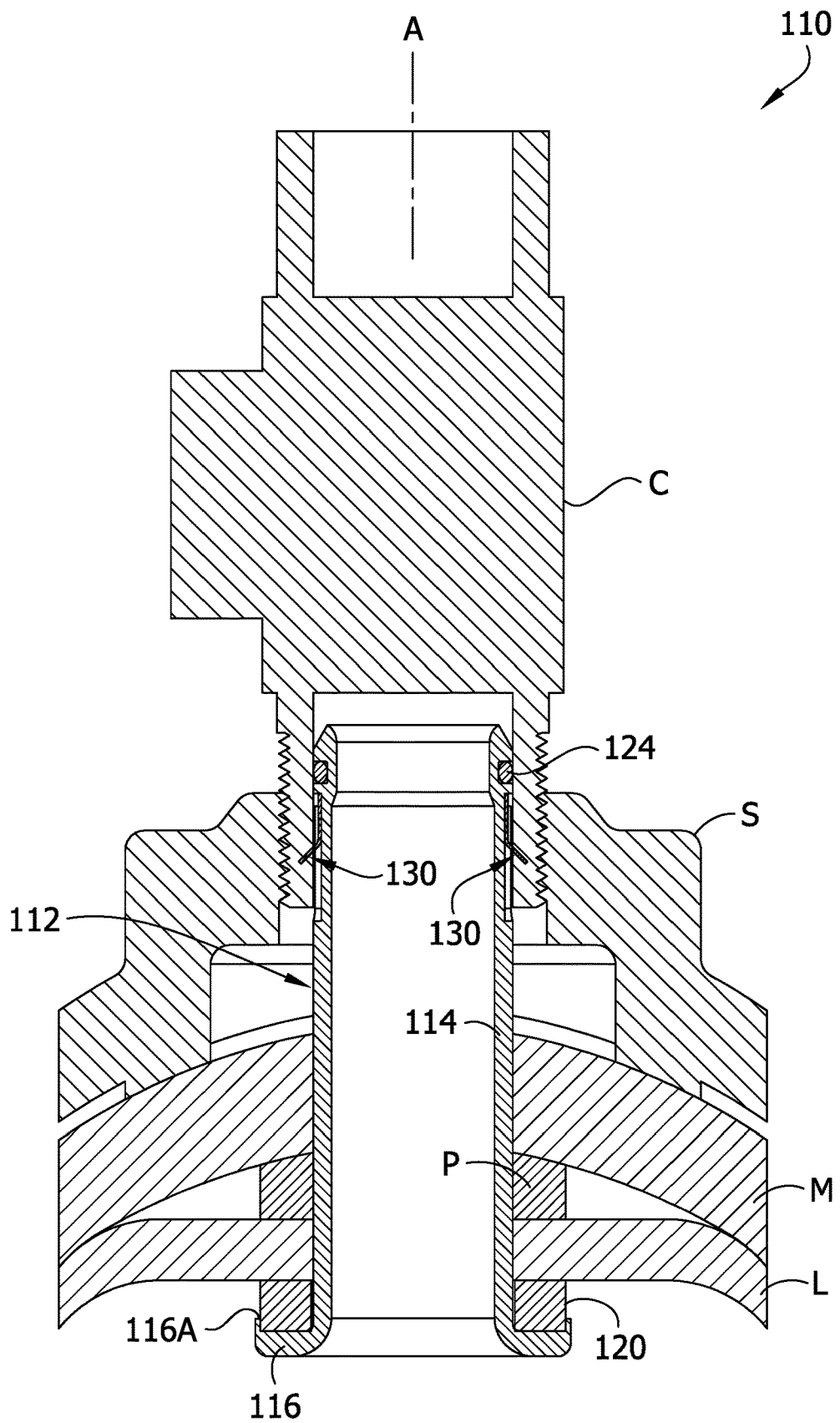
FIG. 10 is a longitudinal section of the fitting of FIG. 9 at an installed position at a junction comprising a corporation stop received in a pipe saddle mounted on the main pipe.

Fittings of the type described herein can be used at various junctions J between lined main pipes M and branch conduits C. For example, referring to FIGS. 9 and 10, one embodiment of a fitting 110 is identical to the fitting 10 in every respect except that it is sized and arranged for being installed in a branch conduit C comprising a pipe saddle S that connects the corporation stop to the main pipe M. In comparison with the fitting 10, the shaft section 114 of the fitting 110 has a greater length along the axis A. The gasket 124 and the fasteners 130 are spaced from the outer end of the fitting body 112 by the same distances as the gasket 24 and the fasteners 30 are spaced from the outer end of the fitting body 12. However the gasket 124 and the fasteners 130 are spaced apart from the flange section 116 by a greater distance than the gasket 24 and the fasteners 30 are spaced from the flange section 16. The greater length of the shaft section 114 allows the gasket 124 to provide a fluid seal between the shaft section 114 and the saddle-mounted corporation stop C and likewise allows the fasteners 130 to establish a mechanical connection between the fitting 110 and the saddle-mounted corporation stop. As above the mechanical connection maintains the fitting 110 in the installed position and the gaskets 120, 124 provide a complete seal of the junction J.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above products and methods without departing from the scope of the invention, it is intended that all matter contained in the above description shall be interpreted as illustrative and not in a limiting sense.

What is claimed is:

1. A fitting for connecting a branch conduit to a liner installed in a main pipe, the fitting comprising:
   a fitting body having an inner end portion and an outer end portion spaced apart along an axis and defining a passage extending through the fitting body from the inner end portion through the outer end portion, the fitting body being configured to be inserted into the branch conduit to position the fitting at an installed position in which the fitting connects the liner to the branch conduit and the passage provides fluid communication between the interior of the liner and the branch conduit, wherein the fitting body comprises a flange section defining the inner end portion and a shaft section defining the outer end portion;
a fastener connected to the fitting body, wherein the fastener is configured to establish a mechanical connection between the fitting and the branch conduit as the fitting body is inserted into the branch conduit without rotating the fastener a complete revolution about the axis, and wherein the mechanical connection secures the fitting body at the installed position; and
an outer gasket extending around the shaft section at a location spaced apart along the axis from the fastener toward the outer end portion of the fitting body, the outer gasket being configured to form a seal between the shaft section and the branch conduit when the fitting body is at the installed position;
a compressible inner gasket extending around the shaft section and seated against the flange section.

2. A fitting as set forth in claim 1, wherein the fastener comprises a tooth protruding from the fitting body.

3. A fitting as set forth in claim 2, wherein the tooth is configured to be resiliently bent as the fitting body is inserted into the branch conduit and wherein the tooth is configured to press against the branch conduit as it resiliently rebounds in the installed position.

4. A fitting as set forth in claim 2, wherein the tooth slopes radially outward from the fitting body and toward the inner end portion from the fitting body.

5. A fitting as set forth in claim 2, wherein the tooth has inner and outer major surfaces, a radially outer edge, and first and second side edges that are angularly spaced apart about a circumference of the fitting body.

6. A fitting as set forth in claim 5, wherein the radially outer edge of the tooth is ground to define a sharp angle with at least one of the inner and outer major surfaces.

7. A fitting as set forth in claim 6, wherein the sharp angle comprises a sharp right angle.

8. A fitting as set forth in claim 2, wherein the fastener further comprises a mounting portion engaged with the fitting body, wherein the mounting portion is oriented transverse to the tooth.

9. A fitting as set forth in claim 2, wherein the fastener is secured to the fitting body without any of a discrete mechanical fastener, an adhesive bond, and a thermal bond.

10. A fitting as set forth in claim 1, wherein the fastener comprises a plurality of teeth protruding from the fitting body at locations spaced apart about the circumference of the fitting body.

11. A fitting as set forth in claim 10, wherein each of the teeth extends radially outward from the outer end portion of the fitting body.

12. A fitting as set forth in claim 1, wherein when the fitting is in the installed position, the inner gasket is configured to form a fluid seal about the fitting body between the fitting body and the liner.

13. A fitting as set forth in claim 12, wherein the mechanical connection is configured to hold the inner gasket in compression between the flange and the liner when the fitting is in the installed position.

14. A fitting as set forth in claim 13, wherein the inner gasket is resiliently compressible such that when the fitting is in the installed position the inner gasket imparts a spring force on the flange section that urges the fitting body inward along the axis away from the liner, wherein the fastener is configured such that the urging of the fitting body inward along the axis strengthens mechanical engagement between the fastener and the branch conduit.

15. A fitting as set forth in claim 14, wherein the fastener comprises a tooth oriented to bear against the branch conduit in response to the spring force.

16. A fitting as set forth in claim 1, wherein the flange section has a perimeter and comprises a rim portion that extends axially from the perimeter toward the outer end portion of the fitting body.

17. A fitting as set forth in claim 16, wherein the rim portion has a height along the axis of the fitting body and the inner gasket has a height along the axis of the fitting body and the height of the rim portion is less than the height of the inner gasket.

18. A fitting as set forth in claim 16, wherein the rim portion is configured to contain the inner gasket so that an entirety of the inner gasket is radially inboard of the perimeter of the flange section when the inner gasket is compressed.

19. A fitting as set forth in claim 16, wherein the rim portion extends circumferentially around a perimeter of the inner gasket.

20. A fitting as set forth in claim 1, wherein the shaft section has a wall thickness in an inclusive range of from about 1 mm to about 3 mm.

21. A fitting as set forth in claim 1, wherein the fitting body has an inner corner between the shaft section and the flange section, the inner corner being arcuate in cross section.

22. A fitting as set forth in claim 21, wherein the inner corner defines a curve in cross section, the curve having an axial dimension along the axis, the flange section having a thickness along the axis, the axial dimension of the curve being greater than the thickness of the flange.

23. A fitting as set forth in claim 1, wherein the fitting body is stainless steel.

24. A fitting for connecting a branch conduit to a liner installed in a main pipe, the fitting comprising:
a fitting body having an inner end portion and an outer end portion spaced apart along an axis and defining a passage extending through the fitting body from the inner end portion through the outer end portion, the fitting body being configured to be inserted into the branch conduit to position the fitting at an installed position in which the fitting connects the liner to the branch conduit and the passage provides fluid communication between the interior of the liner and the branch conduit; and
a fastener connected to the fitting body, wherein the fastener is configured to establish a mechanical connection between the fitting and the branch conduit as the fitting body is inserted into the branch conduit without rotating the fastener a complete revolution about the axis, and wherein the mechanical connection secures the fitting body at the installed position;
wherein the fastener comprises a tooth protruding from the fitting body;
wherein the fastener further comprises a mounting portion engaged with the fitting body, wherein the mounting portion is oriented transverse to the tooth;
wherein the fitting body comprises a swaged region securing the mounting portion of the fastener to the fitting body.

25. A fitting as set forth in claim 24, wherein the fitting body comprises a flange section defining the inner end portion and a shaft section defining the outer end portion.

26. A fitting as set forth in claim 25, wherein the fitting body has an inner corner between the shaft section and the flange section, the inner corner being arcuate in cross section.

27. A fitting as set forth in claim 26, wherein the inner corner defines a curve in cross section, the curve having an axial dimension along the axis, the flange section having a thickness along the axis, the axial dimension of the curve being greater than the thickness of the flange.

28. A fitting as set forth in claim 25, wherein the shaft section has a wall thickness in an inclusive range of from about 1 mm to about 3 mm.

29. A fitting as set forth in claim 24, wherein the fitting body is stainless steel.

30. A rehabilitated pipe system comprising:
   a main pipe;
   a liner;
   a branch conduit; and
   a fitting comprising,
      a fitting body having an inner end portion and an outer end portion spaced apart along an axis and defining a passage extending through the fitting body from the inner end portion through the outer end portion, the fitting body being configured to be inserted into the branch conduit to position the fitting at an installed position in which the fitting connects the liner to the branch conduit and the passage provides fluid communication between the interior of the liner and the branch conduit, wherein the fitting body comprises a flange section defining the inner end portion and a shaft section defining the outer end portion;
      a fastener connected to the fitting body, wherein the fastener is configured to establish a mechanical connection between the fitting and the branch conduit as the fitting body is inserted into the branch conduit without rotating the fastener a complete revolution about the axis, and wherein the mechanical connection secures the fitting body at the installed position; and
      an outer gasket extending around the shaft section at a location spaced apart along the axis from the fastener toward the outer end portion of the fitting body, the outer gasket being configured to form a seal between the shaft section and the branch conduit when the fitting body is at the installed position;
   wherein the fitting is at the installed position.

31. A rehabilitated pipe system set forth in claim 30, wherein the branch conduit comprises a brass corporation stop.

32. A rehabilitated pipe system as set forth in claim 30, wherein the branch conduit comprises a pipe saddle mounted on the main pipe.

* * * * *